UNITED STATES PATENT OFFICE.

JOHN G. KETCHAM, OF OTTAWA, KANSAS, ASSIGNOR OF ONE-HALF TO ADDISON R. HAMILTON, OF SAME PLACE.

PAVEMENT.

SPECIFICATION forming part of Letters Patent No. 364,594, dated June 7, 1887.

Application filed November 4, 1886. Serial No. 218,010. (No specimens.)

*To all whom it may concern:*

Be it known that I, JOHN G. KETCHAM, a citizen of the United States, a resident of Ottawa, in the county of Franklin and State of Kansas, have invented certain new and useful Improvements in Pavements; and I do declare the following to be a full, clear, and exact description of the invention, such as will enable others skilled in the art to which it appertains to make and use the same.

My invention relates to a composition of matter for making pavements; and it consists of the following ingredients in the proportions stated.

I make a bed from broken stones, broken brick, or from gravel, or I make the bed from these combined in equal or nearly equal parts. I then mix fine sand with hot pitch to a consistency that will permit the sand and pitch to be thrown upon the foundation with a shovel, and then spread the mixture of sand and pitch by rolling it with a roller until it becomes smooth, and then sprinkle the layer or surface thus formed with water. I then take Portland cement and calcined plaster and water-cement in equal parts and mix them together and spread over the pitch and sand, and this layer is also rolled down until it becomes smooth. The Portland cement, calcined plaster, and water-cement cause the surface to harden more quickly, and gives to what would otherwise be a dark-colored walk a white appearance, resembling Portland stone or sandstone.

Instead of using calcined plaster and water-cement, I sometimes omit these, and mix fine sand and Portland cement in the proportions of one-half to one-half of each. Then after the walk has been laid ready to roll, I sprinkle the mixture of Portland cement and sand on the walk, and then roll it afterward to fill in, so that it will not come out. This makes a surperior walk, and has the appearance of Portland cement.

Having described this invention, what I claim, and desire to secure by Letters Patent, is—

The herein-described composition of matter for use in making pavements, consisting of a mixture of broken stone, broken brick, and gravel, fine sand mixed with hot pitch, Portland cement, calcined plaster, and water-cement in the proportions substantially as specified.

In testimony whereof I affix my signature in presence of two witnesses.

JOHN G. KETCHAM.

Witnesses:
F. D. NEWBERRY,
G. S. LEGG.